US012129705B2

(12) United States Patent
Docksteader et al.

(10) Patent No.: US 12,129,705 B2
(45) **Date of Patent: *Oct. 29, 2024**

(54) EMERGENCY DOOR CLOSING DEVICE

(71) Applicant: MASONITE CORPORATION, Tampa, FL (US)

(72) Inventors: Benjamin W. Docksteader, Custer, WA (US); Joel Sellinger, Blaine, WA (US)

(73) Assignee: MASONITE CORPORATION, Tampa, FL (US)

(*) Notice: Subject to any disclaimer, the term of this patent is extended or adjusted under 35 U.S.C. 154(b) by 0 days.

This patent is subject to a terminal disclaimer.

(21) Appl. No.: 18/228,929

(22) Filed: Aug. 1, 2023

(65) Prior Publication Data

US 2023/0374843 A1 Nov. 23, 2023

Related U.S. Application Data

(63) Continuation of application No. 17/895,684, filed on Aug. 25, 2022, now Pat. No. 11,713,610, which is a
(Continued)

(51) Int. Cl.

| | |
|---|---|
| ***E05F 15/72*** | (2015.01) |
| ***E05F 1/12*** | (2006.01) |
| ***G08B 3/10*** | (2006.01) |

(52) U.S. Cl.

CPC ................ *E05F 15/72* (2015.01); *E05F 1/12* (2013.01); *G08B 3/10* (2013.01); *E05Y 2201/41* (2013.01);
(Continued)

(58) Field of Classification Search

CPC ... E05F 15/72; E05F 1/12; G08B 3/10; E05Y 2201/41; E05Y 2201/434; E05Y 2201/462;
(Continued)

(56) References Cited

U.S. PATENT DOCUMENTS

| | | | |
|---|---|---|---|
| 1,694,431 | A | 12/1928 | Russell et al. |
| 2,827,284 | A | 3/1958 | Heinz |

(Continued)

FOREIGN PATENT DOCUMENTS

| | | | |
|---|---|---|---|
| CN | 109629954 | A | 4/2019 |
| DE | 2702996 | A1 | 8/1977 |

(Continued)

OTHER PUBLICATIONS

European Search Report Dated Nov. 20, 2020 Received in Related EP Application No. 18791855.2.

*Primary Examiner* — Jerry E Redman
(74) *Attorney, Agent, or Firm* — CANTOR COLBURN LLP

(57) ABSTRACT

An emergency door closing device that can be installed upon existing doors and hinges to automatically close doors in the response to smoke and fire. The improvements incorporated therein include a hinge cam pivot member that attaches to an existing hinge member of a door and produces a moment force about the existing hinge member allowing a reduced force necessary to pivot the door into a closed position. Further, a novel spring, cam, and lever system is incorporated to activate the moment force to close the door.

20 Claims, 12 Drawing Sheets

Related U.S. Application Data continuation of application No. 17/074,876, filed on Oct. 20, 2020, now Pat. No. 11,428,039, which is a continuation of application No. 15/867,628, filed on Jan. 10, 2018, now Pat. No. 10,808,447.

(60) Provisional application No. 62/525,717, filed on Jun. 27, 2017, provisional application No. 62/489,641, filed on Apr. 25, 2017.

(52) U.S. Cl.
CPC ... *E05Y 2201/434* (2013.01); *E05Y 2201/462* (2013.01); *E05Y 2201/474* (2013.01); *E05Y 2201/484* (2013.01); *E05Y 2201/618* (2013.01); *E05Y 2201/638* (2013.01); *E05Y 2201/654* (2013.01); *E05Y 2201/668* (2013.01); *E05Y 2201/722* (2013.01); *E05Y 2400/612* (2013.01); *E05Y 2400/66* (2013.01); *E05Y 2600/46* (2013.01); *E05Y 2900/132* (2013.01); *E05Y 2900/134* (2013.01)

(58) Field of Classification Search
CPC ......... E05Y 2201/474; E05Y 2201/484; E05Y 2201/618; E05Y 2201/638; E05Y 2201/654; E05Y 2201/668; E05Y 2201/722; E05Y 2400/612; E05Y 2400/66; E05Y 2600/46; E05Y 2900/132; E05Y 2900/134
USPC ............................................................. 49/31
See application file for complete search history.

(56) References Cited

U.S. PATENT DOCUMENTS

| | | | | |
|---|---|---|---|---|
| 3,606,699 | A | 9/1971 | Robinson, Jr. | |
| 3,825,973 | A | 7/1974 | Gwozdz | |
| 3,889,316 | A | 6/1975 | Koike | |
| 3,889,874 | A | 6/1975 | Arwood | |
| 4,188,984 | A | 2/1980 | Lyall | |
| 4,672,773 | A | 6/1987 | Bilt | |
| 4,754,572 | A | 7/1988 | Bilt | |
| 5,746,166 | A | 5/1998 | Valasopoulos | |
| 5,878,530 | A | 3/1999 | Eccleston et al. | |
| 5,937,478 | A | 8/1999 | Regnier | |
| 6,142,541 | A | 11/2000 | Rotondi | |
| 6,481,160 | B1 | 11/2002 | Kowalczyk | |
| 6,891,479 | B1 | 5/2005 | Eccleston | |
| 7,021,005 | B1 | 4/2006 | Curry | |
| 7,367,161 | B1 | 5/2008 | Jones | |
| 7,610,684 | B2 | 11/2009 | Steinich | |
| 8,169,169 | B2 | 5/2012 | Hass et al. | |
| 8,220,202 | B2 | 7/2012 | Riley et al. | |
| 8,261,491 | B2 | 9/2012 | Yulkowski et al. | |
| 9,574,389 | B2 | 2/2017 | Menze et al. | |
| 9,725,941 | B2 | 8/2017 | Van Tassell, III | |
| 10,053,898 | B1 | 8/2018 | Lashley et al. | |
| 10,081,977 | B2 | 9/2018 | Shelley | |
| 10,626,651 | B2 | 4/2020 | Chang | |
| 10,808,447 | B2 * | 10/2020 | Docksteader | E05F 15/72 |
| 10,947,768 | B2 | 3/2021 | Walser | |
| 11,002,061 | B1 | 5/2021 | Maiga et al. | |
| 11,072,964 | B2 | 7/2021 | Teta et al. | |
| 11,136,812 | B2 | 10/2021 | Rabinowitz et al. | |
| 11,174,664 | B2 | 11/2021 | Sellinger et al. | |
| 11,215,003 | B2 | 1/2022 | Nash | |
| 11,261,644 | B2 | 3/2022 | Eccleston | |
| 11,377,895 | B2 | 7/2022 | Cohen | |
| 11,428,039 | B2 * | 8/2022 | Docksteader | E05F 1/12 |
| 11,434,682 | B2 | 9/2022 | Sellinger et al. | |
| 11,585,143 | B1 | 2/2023 | Iriarte | |
| 11,608,670 | B2 | 3/2023 | Sellinger et al. | |
| 11,639,625 | B2 | 5/2023 | Chi-Hsueh et al. | |
| 11,697,958 | B1 | 7/2023 | Weinerman et al. | |
| 11,713,610 | B2 * | 8/2023 | Docksteader | G08B 3/10 49/31 |
| 2004/0103584 | A1 | 6/2004 | Freeman | |
| 2005/0091928 | A1 | 5/2005 | Okulov et al. | |
| 2006/0093307 | A1 | 5/2006 | Lowentat et al. | |
| 2006/0124249 | A1 * | 6/2006 | Hsieh | E06B 9/82 160/9 |
| 2009/0027198 | A1 | 1/2009 | Dipoala et al. | |
| 2009/0260292 | A1 | 10/2009 | Hansch | |
| 2010/0065705 | A1 | 3/2010 | Brown et al. | |
| 2010/0115853 | A1 | 5/2010 | Gebhart et al. | |
| 2010/0242368 | A1 | 9/2010 | Yulkowski | |
| 2011/0016971 | A1 | 1/2011 | Yulkowski et al. | |
| 2011/0252597 | A1 | 10/2011 | Burris et al. | |
| 2012/0272576 | A1 | 11/2012 | Van Tassell, III et al. | |
| 2013/0145692 | A1 | 6/2013 | Laird et al. | |
| 2013/0318878 | A1 | 12/2013 | Manseder | |
| 2013/0326960 | A1 | 12/2013 | Manseder | |
| 2014/0145576 | A1 | 5/2014 | White et al. | |
| 2014/0190083 | A1 | 7/2014 | Lepie | |
| 2015/0059250 | A1 | 3/2015 | Miu et al. | |
| 2015/0130287 | A1 | 5/2015 | Steudtner et al. | |
| 2016/0010378 | A1 | 1/2016 | Ziemkowski et al. | |
| 2016/0083990 | A1 | 3/2016 | Ricks et al. | |
| 2016/0084678 | A1 | 3/2016 | Ricks et al. | |
| 2016/0179089 | A1 | 6/2016 | Stratmann | |
| 2016/0237732 | A1 | 8/2016 | Kerley | |
| 2017/0084144 | A1 | 3/2017 | Ricks et al. | |
| 2017/0260783 | A1 | 9/2017 | Crolley | |
| 2018/0016836 | A1 | 1/2018 | Ibsies | |
| 2018/0058130 | A1 | 3/2018 | Shelley | |
| 2018/0080270 | A1 | 3/2018 | Khan et al. | |
| 2018/0108230 | A1 | 4/2018 | Finnegan | |
| 2018/0305969 | A1 | 10/2018 | Docksteader et al. | |
| 2019/0364244 | A1 | 11/2019 | Siminoff et al. | |
| 2019/0390503 | A1 | 12/2019 | Teta et al. | |
| 2020/0056414 | A1 | 2/2020 | Oestermann et al. | |
| 2020/0102779 | A1 | 4/2020 | Rabinowitz | |
| 2020/0190885 | A1 | 6/2020 | Coleman | |
| 2020/0386029 | A1 | 12/2020 | Nash | |
| 2021/0317697 | A1 | 10/2021 | Tulsidas | |
| 2022/0065019 | A1 | 3/2022 | Sellinger et al. | |
| 2022/0403692 | A1 * | 12/2022 | Docksteader | E05F 15/72 |
| 2023/0220721 | A1 * | 7/2023 | Sellinger | G08B 3/10 49/31 |
| 2023/0287724 | A1 | 9/2023 | Sellinger et al. | |
| 2023/0374843 | A1 * | 11/2023 | Docksteader | E05F 1/12 |

FOREIGN PATENT DOCUMENTS

| | | | | |
|---|---|---|---|---|
| DE | 19964251 | A1 | 4/2003 | |
| DE | 102018008812 | A1 | 5/2020 | |
| EP | 1944446 | A2 | 7/2008 | |
| GB | 1362194 | A | 7/1974 | |
| JP | 2013107733 | A | 6/2013 | |
| JP | 2013174077 | A | 9/2013 | |
| KR | 101841357 | B1 | 5/2018 | |
| WO | 2018200726 | A1 | 11/2018 | |
| WO | WO-2019191606 | A1 * | 10/2019 | E05F 15/63 |
| WO | 2021089802 | A1 | 5/2021 | |

* cited by examiner

EMERGENCY DOOR CLOSING DEVICE

CROSS-REFERENCE TO RELATED APPLICATION

The present application is a continuation of U.S. patent application Ser. No. 17/895,684, filed Aug. 25, 2022, now U.S. Pat. No. 11,713,610, which is a continuation of U.S. patent application Ser. No. 17/074,876, filed Oct. 20, 2020, now U.S. Pat. No. 11,428,039, which is a continuation of U.S. patent application Ser. No. 15/867,628, filed Jan. 10, 2018, now U.S. Pat. No. 10,808,447, which claims priority to prior U.S. Provisional Application Nos. 62/489,641, filed Apr. 25, 2017 and 62/525,717, filed Jun. 27, 2017, which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR 1.71(d).

BACKGROUND OF THE INVENTION

Field of the Invention

The present invention relates generally to emergency equipment, specifically to a device for detecting a fire and closing a door attached thereto and alerting occupants in response.

Background of the Related Art

In the firefighting/fire protection industry there is ample information and data to show that a closed door, even a cheap hollow core residential door, will greatly reduce the spread of fire and smoke. This can save lives, limit damage, and in some cases even help suppress the fire. For many/most people the idea of closing all doors in the home all the time or even every night is not appealing or otherwise burdensome. The instant invention can close the doors when triggered by an input, for example, a built in smoke detector, an audio trigger from other smoke detectors, a wireless signal from a home protection system, and a manual button by a user.

Previous similar apparatuses simply close a door in response to a smoke detector signal and usually require large mechanical pieces attached to an adjacent wall to move the door into its closed position. Installing such devices are difficult, time consuming, and expensive. Further, in the case of larger, heavier doors the previous apparatuses sometimes do not produce the force necessary to push it into a closed and secure position in a short period of time, if at all, and thereby allow smoke and heat to pass through a doorway before closing.

Thus, a need exists to develop and implement an improved emergency door closing device such as the instant invention to avoid the above-mentioned problems.

BRIEF SUMMARY OF THE INVENTION

In view of the foregoing disadvantages inherent in the known emergency door closing devices and information readily available in the art, the present invention provides a novel emergency door closing device. The general purpose of the present invention, which will be described subsequently in greater detail, is to provide a device for detecting a fire and closing a door attached thereto and alerting occupants in response.

In general terms, there are three embodiments that can be incorporated that can be installed upon existing door hinges thereby reducing the time and effort and costs of installing upon doors. Within these embodiments a main feature of the instant invention is a hinge cam pivot member that attaches to the existing hinge member of the door and produces a moment force about the existing hinge member allowing a reduced force necessary to pivot the door into its closed position. Further, a novel spring, cam, and lever system is incorporated to activate the moment force to close the door.

The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The images which accompany the written portion of this specification illustrate embodiments and method(s) of use for the present invention according to the teachings of the present invention.

The various embodiments of the present invention will hereinafter be described in conjunction with the appended drawings.

DETAILED DESCRIPTION

As discussed above, embodiments of the present invention relate to a device for detecting a fire and closing a door attached thereto and alerting occupants in response.

Figure 1:
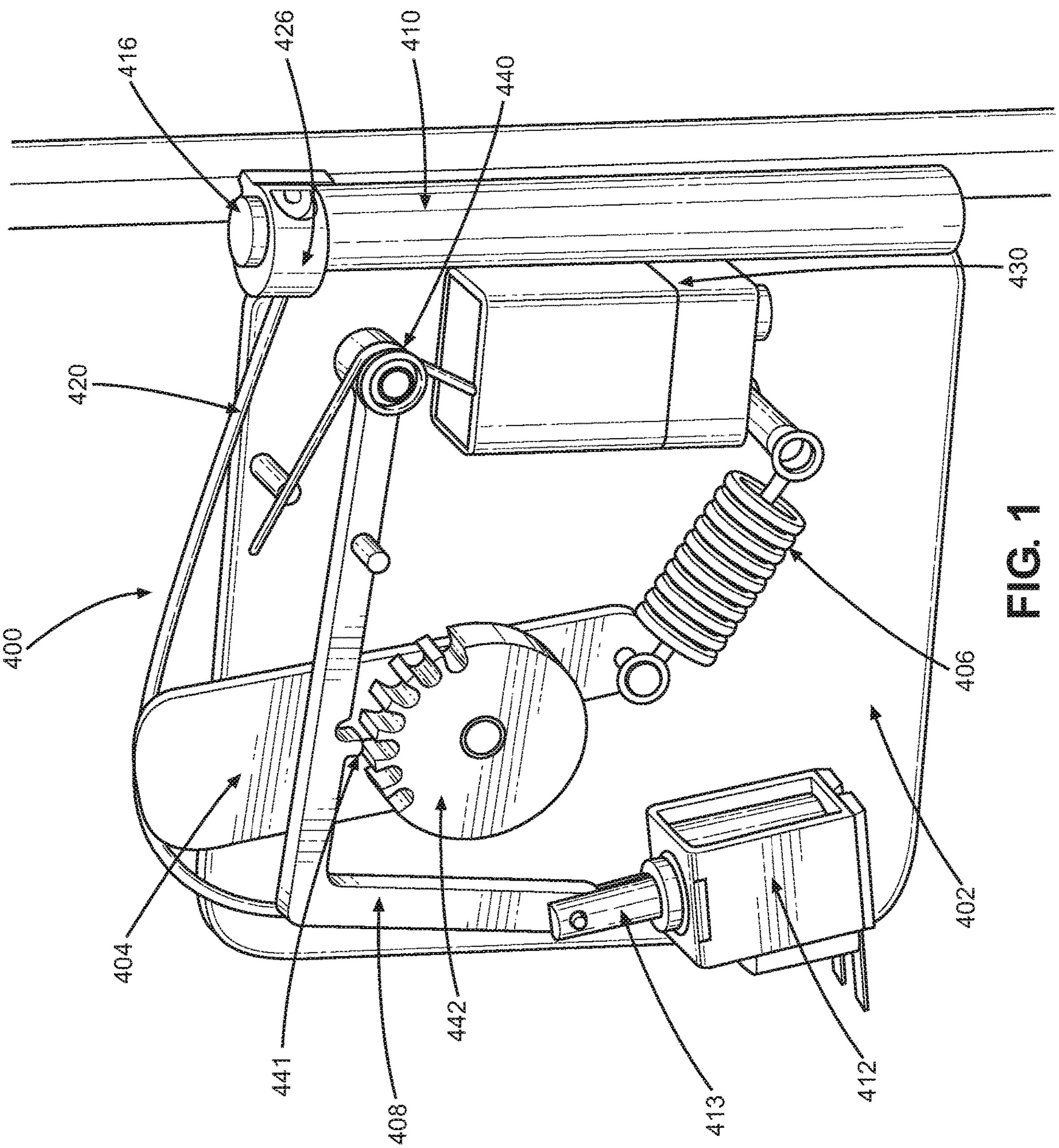
FIG. 1 shows a perspective view of an emergency door closing device according to a first embodiment of the present invention.

Referring now to FIG. 1, the emergency door closing device (400) according to a first embodiment incorporates cable (420) being anchored on one end to a base plate member (402) and on the other end to a pivot cam (426). The pivot cam has a hole so it mates to the residential hinge assembly (410), including a hinge pin (416), and an arm that prevents the entire cam from rotating towards the door when acted on by the cable. In the unloaded state a main torsion spring (406) is forcing the closing cam upwards taking up any tension in the cable. The user can feel the spring tension when they open the door. As the door opens the pivot cam ensures the distance the between anchored ends of the cable is reduced. As the distance changes the cable tries to achieve a straight line, this forces the closing cam (404) downward against the tension of the main torsion spring. A solenoid lever (408) has a pawl feature (441) that engages a gear (442) on the closing cam. The lever torsion spring (440) forces the pawl feature into the gear feature on the closing cam so the force developed in the main torsion spring is held. When the door is open to its maximum opening angle the device is loaded. The spring force is held by the lever and the door can operator normally (open and close without the user feeling the spring force). When the device is loaded and the door is closed the cable is slack but routed along a groove in the closing cam. When the device is triggered (triggering event is input from user (Test) or fire safety device (wifi, zigbee, Bluetooth, audio trigger) the lever releases the cam so the cam and torsion spring act on the cable to pull the door shut. In this instance the lever is released by a battery (430) and a battery operated solenoid member (412) with PCB and relay control. The solenoid member (412) releases (de-energized) via a timer or other input and spring force returns the pawl to the gear teeth. The device mechanism is automatically reloaded when the door is opened. The gear and pawl act as a ratchet to hold the force of the closing spring.

Figure 2:
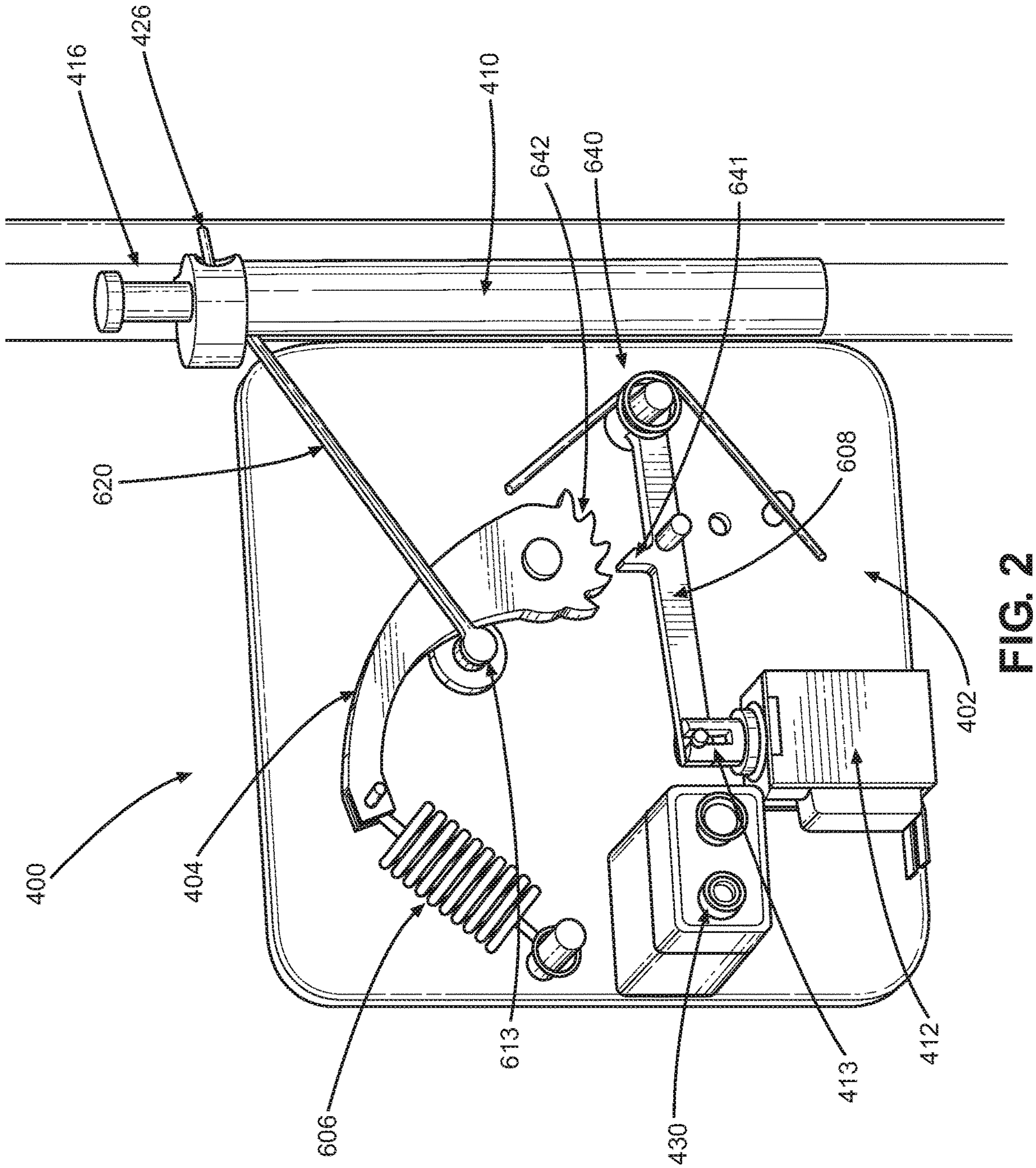
FIG. 2 shows a perspective view of an emergency door closing device according to a second embodiment of the present invention.

Referring now to FIG. 2, the emergency door closing device (400) according to a second embodiment incorporates cable (620) being attached to a cable disk (613) which may contain a roller bearing one end and on the other end to the pivot cam (626). The cable disk is help in place against the curved closer by initial spring force and mating groove. The pivot cam has a hole so it mates to the residential hinge and an arm that prevents the entire cam from rotating towards the door when acted on by the cable. In the unloaded state the main extension spring (606) is forcing the curved closer downwards taking up any tension in the cable. The user can feel the spring tension when they open the door. As the door opens the pivot cam ensures the distance the between anchored ends of the cable is reduced. As the distance changes the cable forces the curved closer upwards and may change the moment arm relationship between the curved closer and the cable disk. This acts against the main extension spring creating torque. The solenoid lever (608) has a pawl feature (641) that engages the gear (642) on the curved closer. The lever torsion spring (640) forces the pawl feature into the gear feature on the curved closer so the force developed in the main torsion spring is held. When the door is open to its maximum opening angle the device is loaded. The spring force is held by the lever and the door can operator normally (open and close without the user feeling the spring force). When the device is loaded and the door is closed the cable is slack and cable disk is free to float against the curved closer. When the device is triggered (triggering event is input from user (Test) or fire safety device (wifi, zigbee, Bluetooth, audio trigger) the lever releases the cam so the cam and torsion spring act on the cable to pull the door shut. In this instance the lever is released by a battery operated solenoid with PCB and relay control. The device mechanism is automatically reloaded when the door is opened.

Another embodiment is illustrated in FIGS. 3*a*, 3*b*, 6, and 7, wherein the emergency door closing device (400) incorporates cable (520) being anchored on one end to the closing cam gear (504) and on the other end to the pivot cam (526). The cable is routed around the closing cam axel. The axle may have a cam feature or reduced diameter feature to add additional torque to the cable when closing. The pivot cam has a hole so it mates to the residential hinge via the hinge pin and an arm that prevents the entire cam from rotating towards the door when acted on by the cable. In the unloaded state the main torsion spring (506) is forcing the closing cam upwards taking up any tension in the cable. The user can feel the spring tension when they open the door. As the door opens the pivot cam ensures the distance the between anchored ends of the cable is reduced. As the distance changes the cable winds the closing cam gear (504) against the tension of the main torsion spring. The solenoid lever (508) has a pawl feature (541) that engages the gear teeth (542) on the closing cam. The lever torsion spring (540) forces the pawl feature into the gear feature on the closing cam so the force developed in the main torsion spring is held. When the door is open to its maximum opening angle the device is loaded. The spring force is held by the lever and the door can operator normally (open and close without the user feeling the spring force). When the device is loaded and the door is closed the cable is slack. When the device is triggered (triggering event is input from user (Test) or fire safety device (wifi, zigbee, Bluetooth, audio trigger) the lever releases the cam so the cam and torsion spring act on the cable to pull the door shut. In this instance the lever is released by a battery operated solenoid with PCB and relay control—the solenoid overcomes the force of the lever torsion spring to disengage the pawl. The solenoid releases with a timer and the torsion spring reengages. The device mechanism is automatically reloaded when the door is opened and the main torsion spring is tensioned and held via the gear and pawl mechanism.

Figure 7:
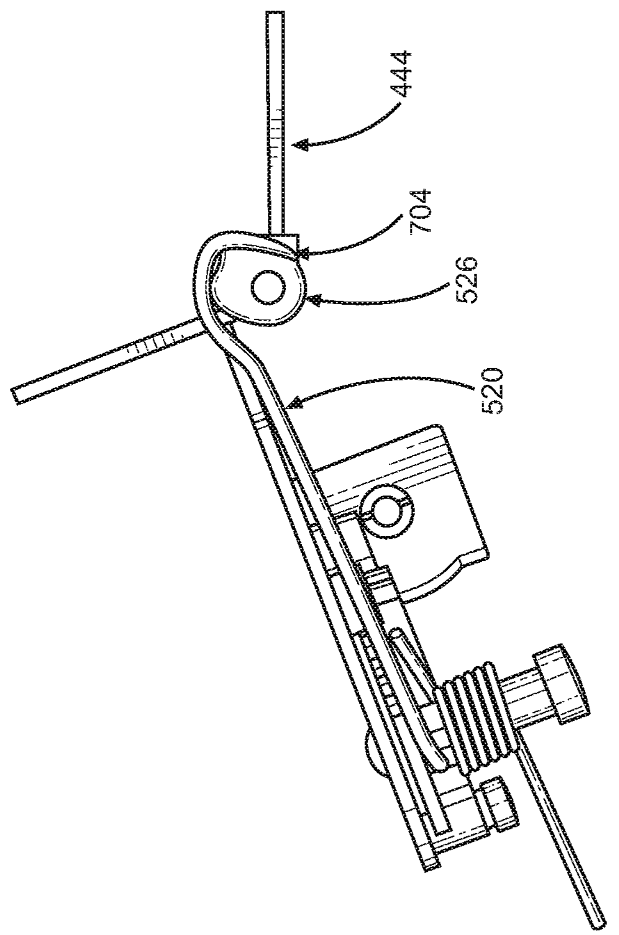
FIG. 7 shows a top view of the emergency door closing device of the third embodiment shown in FIG. 3*a* in a door-open position with the cable member partially wrapped around the pivot cam member.
Figure 6:
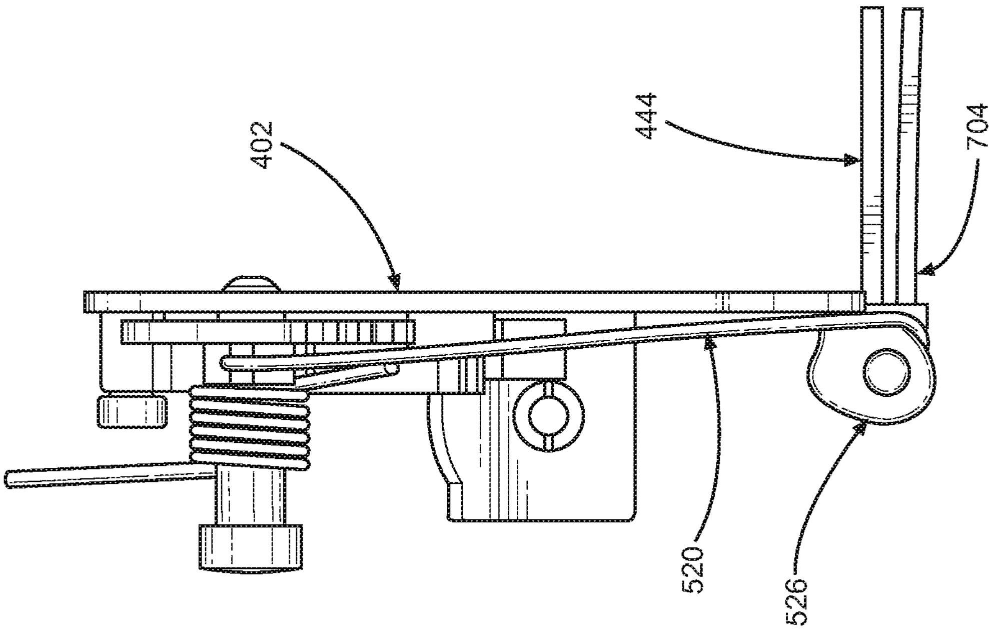
FIG. 6 shows a top view of the emergency door closing device of the third embodiment shown in FIG. 3*a* in a door-closed position.

More specifically, the embodiment as illustrated in FIGS. 3-9, comprising a base plate member (402) adapted to be connected to an outer surface of an existing door (100) in proximity to a hinged portion thereof; a pivot cam member (526) adapted to be connected to a hinge pin (416) of a hinge member (410) pivotally holding said existing door (100) to a door frame (200), and wherein the pivot cam member (526) is adapted to be held in place against a hinge plate (444) of the hinge member (410) attached to the door frame (200); a closing cam gear (504) being rotatably and biasingly connected to the base plate member (402) and is adapted to be releasably held in place via the pawl member (541) of the lever member (508), and wherein the closing cam gear (504) includes the plurality of gear teeth (542) each adapted to releasably retain said pawl member (541) between any two of the plurality of gear teeth (542); a cable member (520) connected at a distal end to the pivot cam member (526) and is connected at a proximal end to the closing cam gear (504), such that when the existing door (100) is pivoted into an open position, as illustrated between FIGS. 6 and 7, the cable member (520) partially wraps around the pivot cam member (526) and pulls upon and rotates the closing cam gear (504); a first spring member formed as the main torsion spring member (506) connected between the base plate member (402) and the closing cam gear, wherein the first spring member is adapted to gain potential energy when the existing door (100) is moved into an open position and the cable member (520) rotates the closing cam gear (504), FIG. 7, wherein the first spring member (506) is adapted to retain said potential energy when the closing cam gear (504) is held in place via the pawl member (541) of a lever member (508), and wherein when the closing cam gear is released by the pawl member of the lever member the first spring member (506) releases the potential energy thereby rotating the closing cam gear, thereby pulling the cable member, thereby pushing, pivoting, and closing the existing door member; the lever member (508) includes a distal end, a proximal end, and a center section, wherein the lever member is pivotally connected to the base plate member (402) at its center section thereof, wherein the lever member includes the pawl member (541) thereon and is adapted to be releasably placed and retained between any two of the plurality of gear teeth (542) of the closing cam gear, and is adapted to move in and out from between any two of the plurality of gear teeth via the pivoting motion of the lever member, and wherein the pawl member includes a cam surface (543) on one side thereof adapted to allow the pawl member to progressively move between the plurality of gear teeth as the existing door is opened to thereby progressively increase the potential energy of the first spring member (506); a second spring member formed as the solenoid lever spring (540) connected to the base plate member (402) in proximity to the distal end of the lever member (508), is connected to the distal end of the lever member, and is adapted to bias the lever member and thereby pivot the pawl member (541) toward the closing cam gear (504); the solenoid member (412) is connected to the base plate member (402) in proximity to the proximal end of the lever member, is connected to the proximal end of the lever member, and is adapted to move the proximal end of said lever member to thereby overcome the spring force of the second spring member and pivot the lever member and move the pawl member out from in between the any two of the plurality of gear teeth, to thereby allow the first spring member to release the potential energy of the first spring member and thereby close the existing door; a fire, smoke, and emergency signal detector (600) connected to the base plate member and is adapted to send an electric signal to the solenoid member (412) when fire, smoke, or an emergency is detected, to thereby move the lever member and thereby the pawl member to thereby allow the first spring member to release the potential energy of the first spring member and thereby close the existing door; and a power source formed as the battery member (430) connected to the base plate member, is electrically connected to the solenoid member (412) and the fire, smoke, and emergency signal detector, and is adapted to send electric power thereto. Furthermore, the fire, smoke, and emergency signal detector includes an alarm member (610) adapted to emit an audio sound when fire, smoke, or an emergency signal is detected, and wherein the alarm member may include a speaker member (615).

Figure 8:
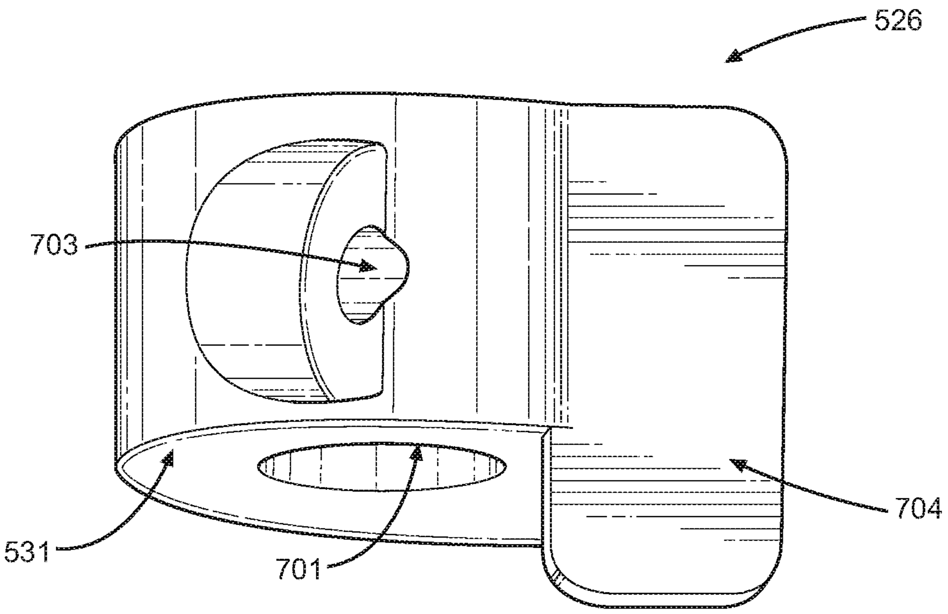
FIG. 8 shows a first perspective view of the pivot cam member.
Figure 9:
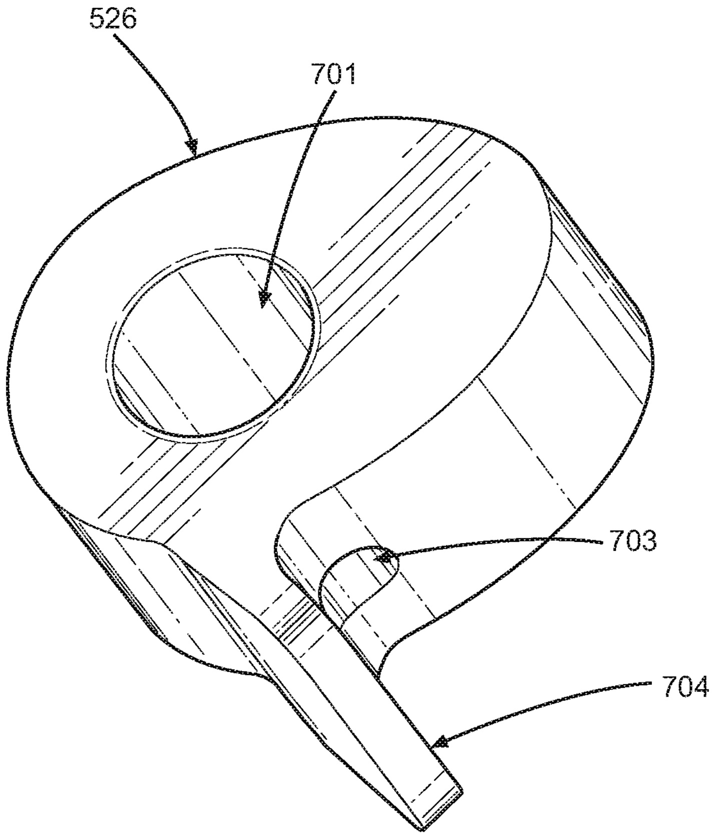
FIG. 9 shows a second perspective view of the pivot cam.

Referring specifically to FIGS. 8 and 9, pivot cam member (526) mates to the existing residential hinge (410) via the hinge pin (416). Tang member (704) on the side of the pivot cam contacts the hinge plate (444) of the existing hinge assembly (410) and prevents rotation thereto. The pivot hinge has a different center of rotation so the hinge and the closing mechanism have different pivot points to help ensure that a moment force is created making it easier to pull the door shut by the spring.

The pivot cam member (526) includes a main body portion (531) including a cylindrical center hole (701) adapted to receive the hinge pin (416) of the hinge member (410) therethrough, an outer surface, a top surface, a bottom surface, wherein the bottom surface is adapted to be place upon an upper edge of the hinge plate (444) of the hinge member (410) attached to the door frame; and the tang member (704) that is attached to and extends from the main body portion (531) and is adapted to contact a surface of the hinge plate (444) of the existing residential hinge member (410), to thereby prevent rotation of the pivot cam member with respect to the hinge plate (444) of the existing door as its being pivoted. The tang member (704) is formed having a flat surface adapted to be placed against a flat surface of the hinge plate (444) of the hinge member (410).

The main body portion (531) may be formed having an oblong cross-section and further include an aperture (703) therethrough adapted to receive and hold a portion of said distal end of said cable member (520) therein.

The distal end of the cable member (520) may include a connector member (522) thereon adapted to be held by the aperture (703) of the main body portion. The plurality of gear teeth (542) of said closing cam gear (504) may be located on and extend outwardly from an outer edge thereof. The first spring member (506) may be formed as a helical spring. The second spring member (540) may be formed as a helical spring. The power source (430) may be formed as a removable battery member, such as a nine volt battery member. And the solenoid member (412) may include a movable plunger member (413) adapted to connect with and move said proximal end of said lever member (508).

Figure 3A:
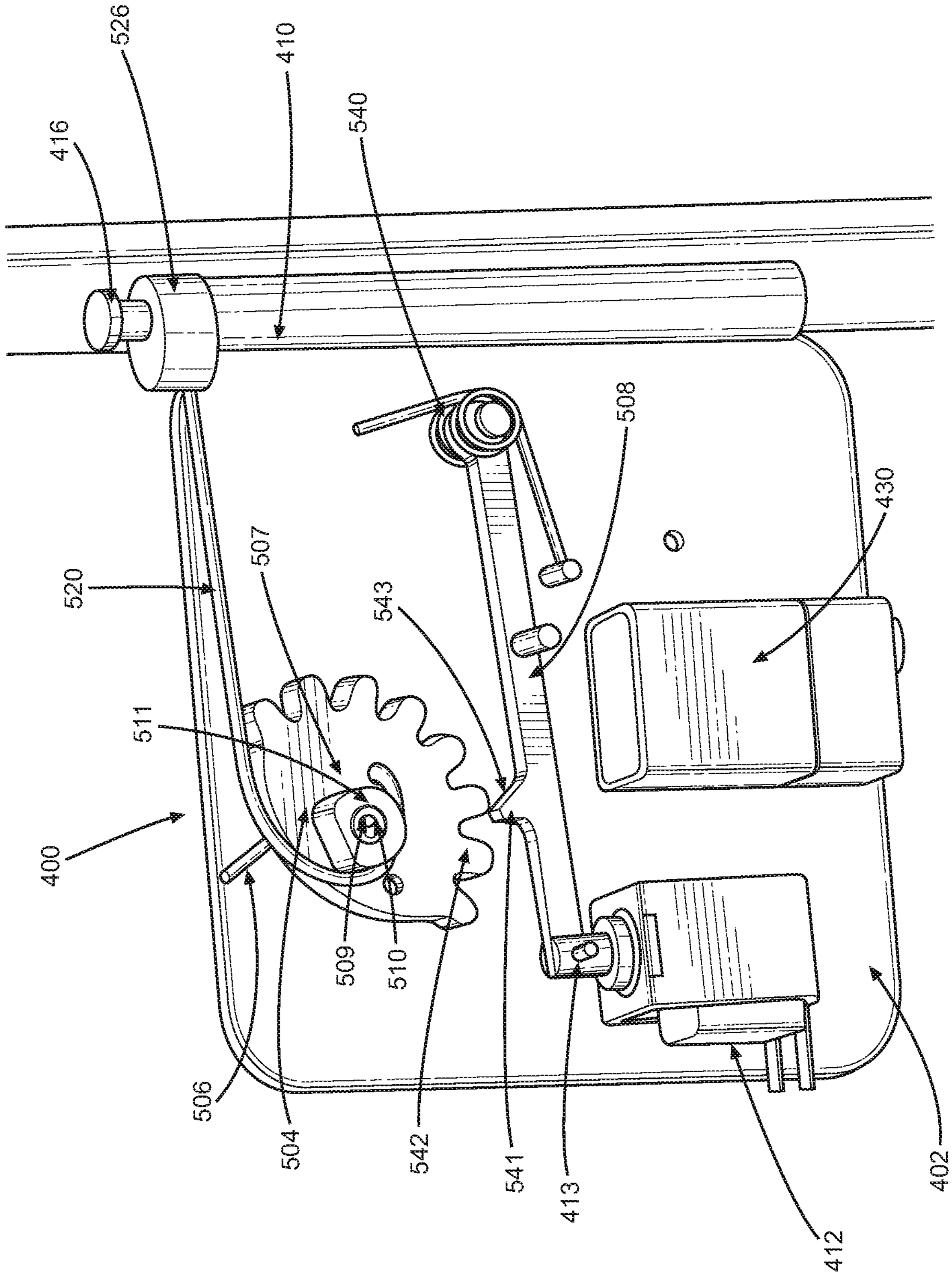
FIG. 3*a* shows a perspective view of an emergency door closing device according to a third embodiment of the present invention.
Figure 3B:
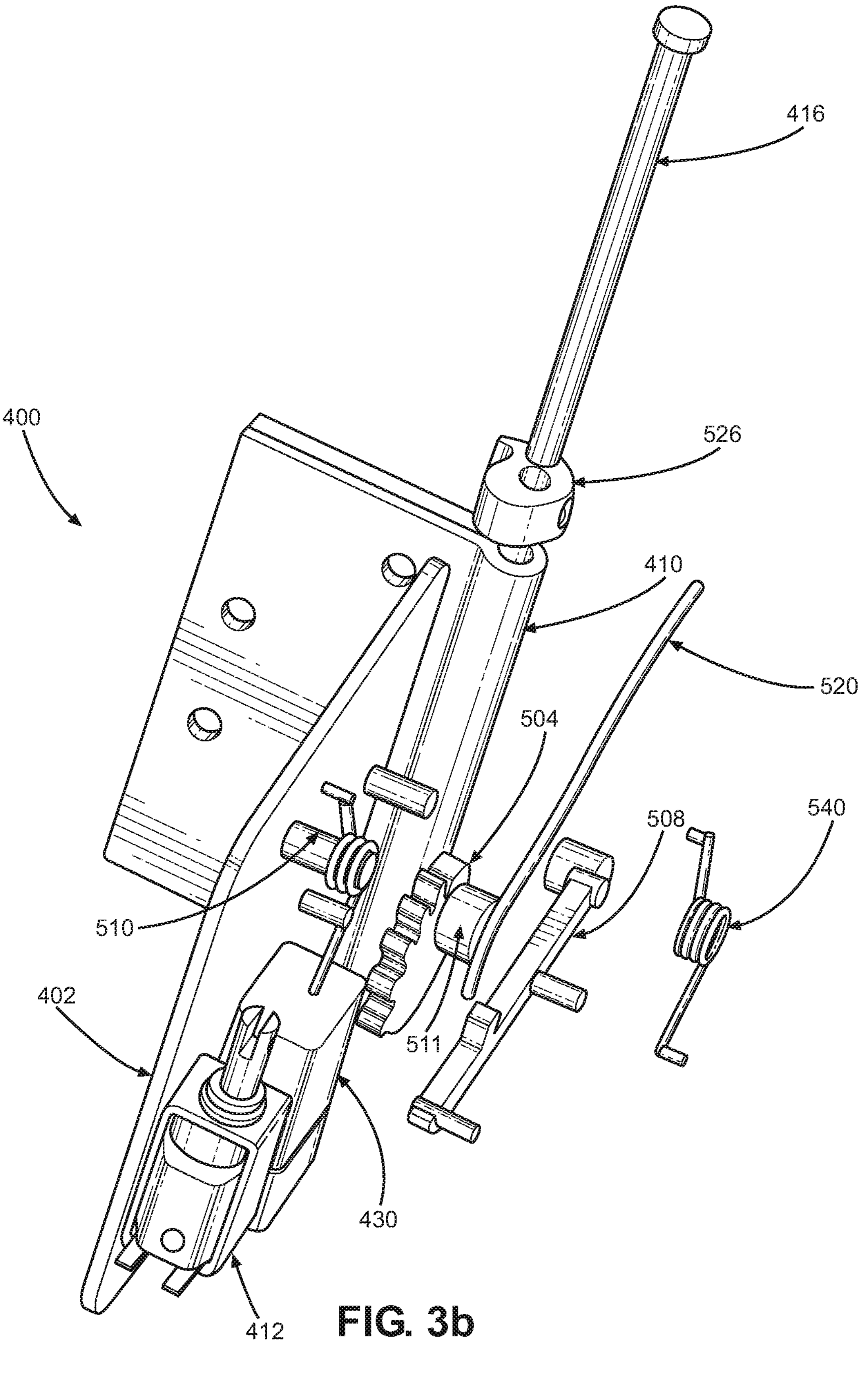
FIG. 3*b* shows an exploded view of the emergency door closing device of the third embodiment shown in FIG. 3*a*.
Figure 4:
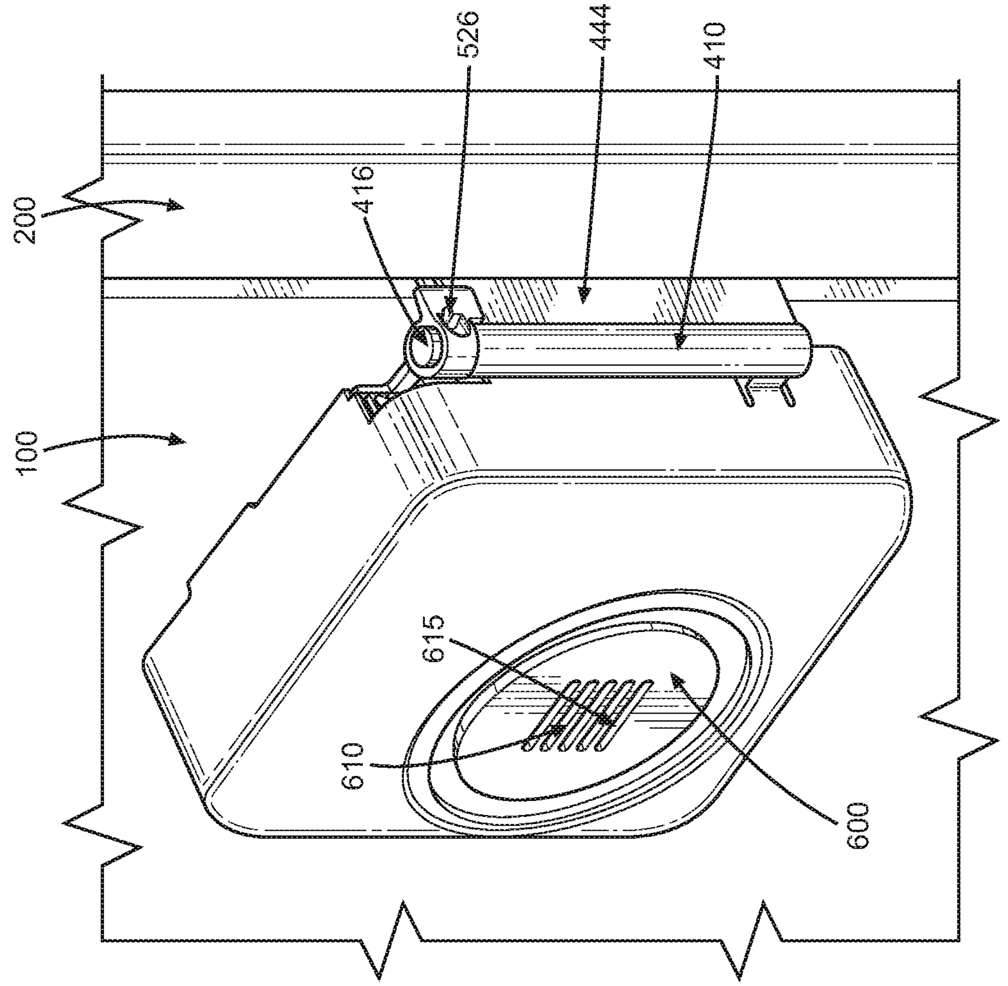
FIG. 4 shows a perspective view of the emergency door closing device installed upon an existing door and door hinge.
Figure 5:
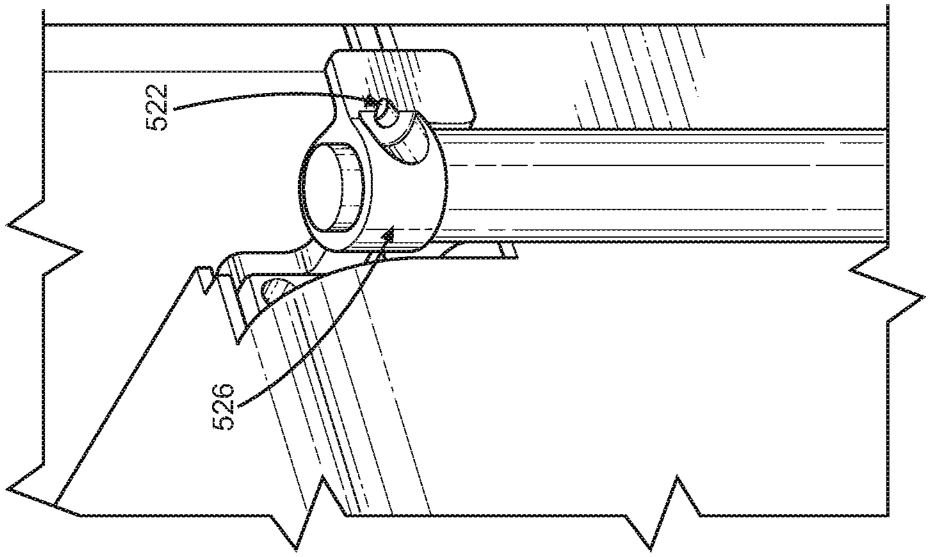
FIG. 5 shows a perspective view of the emergency door closing device installed upon an existing door and door hinge with a close-up of the pivot cam installed upon the door hinge.

As best illustrated in FIGS. 3*a* and 3*b*, the closing cam gear (504) may further includes a main body portion including a flat plate member (507), wherein the plurality of gear teeth are located on and extend outwardly from an outer edge of said flat plate member, a center aperture (509) adapted to receive and pivot about a pivot member (510) of the base plate member (402); a cable cylinder member (511) attached to and extends from said flat plate member and surrounds said center aperture, and is adapted to contact said cable member (520) as it is pulled to thereby increase the distance the cable member is pulled as the door is pivoted. The cable cylinder member (511) may be formed having an oblong cross section to thereby increase further the distance the cable member is pulled as the door is pivoted. The pivot member (510) of the base plate member (402) extends therefrom and is adapted to extend through the center aperture of the main body portion of the closing cam gear and pivotally hold the closing cam gear in place and facilitate the pivoting motion of the closing cam gear. And, the distal end of the pivot cam member may be connected to an upper surface of the main body portion of the closing cam gear at a distance from said cable cylinder member, such that when the closing cam gear is pivoted the distance the cable member is pulled is maximized.

The preferred embodiment is now discussed and illustrated in FIGS. 10-14, wherein the closing cam gear is replaced with a linearly moving closing bar 800, the lever bar 810 pivots at its distal end via a pivot post 815 and is biased by a second spring member 817 via a center section thereof, and the solenoid member is replaced with a motor member 820. As such, the emergency door closing device comprises the base plate member; the pivot cam member; a closing bar 800 being linearly movable and biasingly connected to the base plate member and is adapted to be releasably held in place via the pawl member 812 of the lever member, and includes a plurality of gear teeth 805 each adapted to releasably retain the pawl member 812 between any two of the plurality of gear teeth 805; the cable member 830 being connected at its proximal end to the closing bar 800, such that when the existing door is pivoted into said open position the cable member partially wraps around said pivot cam member 840 and pulls upon and linearly moves the closing bar; a first spring member 835 that linearly moves the closing bar 800; the lever member 810 including a distal end, a proximal end, and a center section, and is pivotally connected to the base plate member at the distal end thereof via the pivot post 815, the lever member 810 includes the pawl member 812 thereon and is adapted to be releasably placed and retained between any two of the plurality of gear teeth 805 of the closing bar 800, and are adapted to move in and out from between the any two of the plurality of gear teeth via the pivoting motion of the lever member about its distal end; the second spring member 817 being connected to the base plate member at a proximal end thereof, is connected to the pivot post 815 at the middle section thereof, and is connected to the center section of the lever member 810 at its thereof, and is adapted to pivotally bias the lever member 810 and thereby pivot the pawl member 812 toward the closing bar 800; a motor member 820 including a motor 827 and a plunger member 828 mechanically connected to and is linearly movable via the motor 827, wherein the motor member is connected to the base plate member, is connected to the proximal end of the lever member 810, and is adapted to move the proximal end of the lever member, such that when activated the plunger 828 pulls down on the lever member 810 and thereby disengages from the closing bar 800 and allows the first spring member 835 to release its potential energy and thereby close the existing door; the fire, smoke, and emergency signal detector 900 connected to the base plate member adapted to send an electric signal to the motor member 827 when fire, smoke, or an emergency is detected; and the power source.

Figure 10:
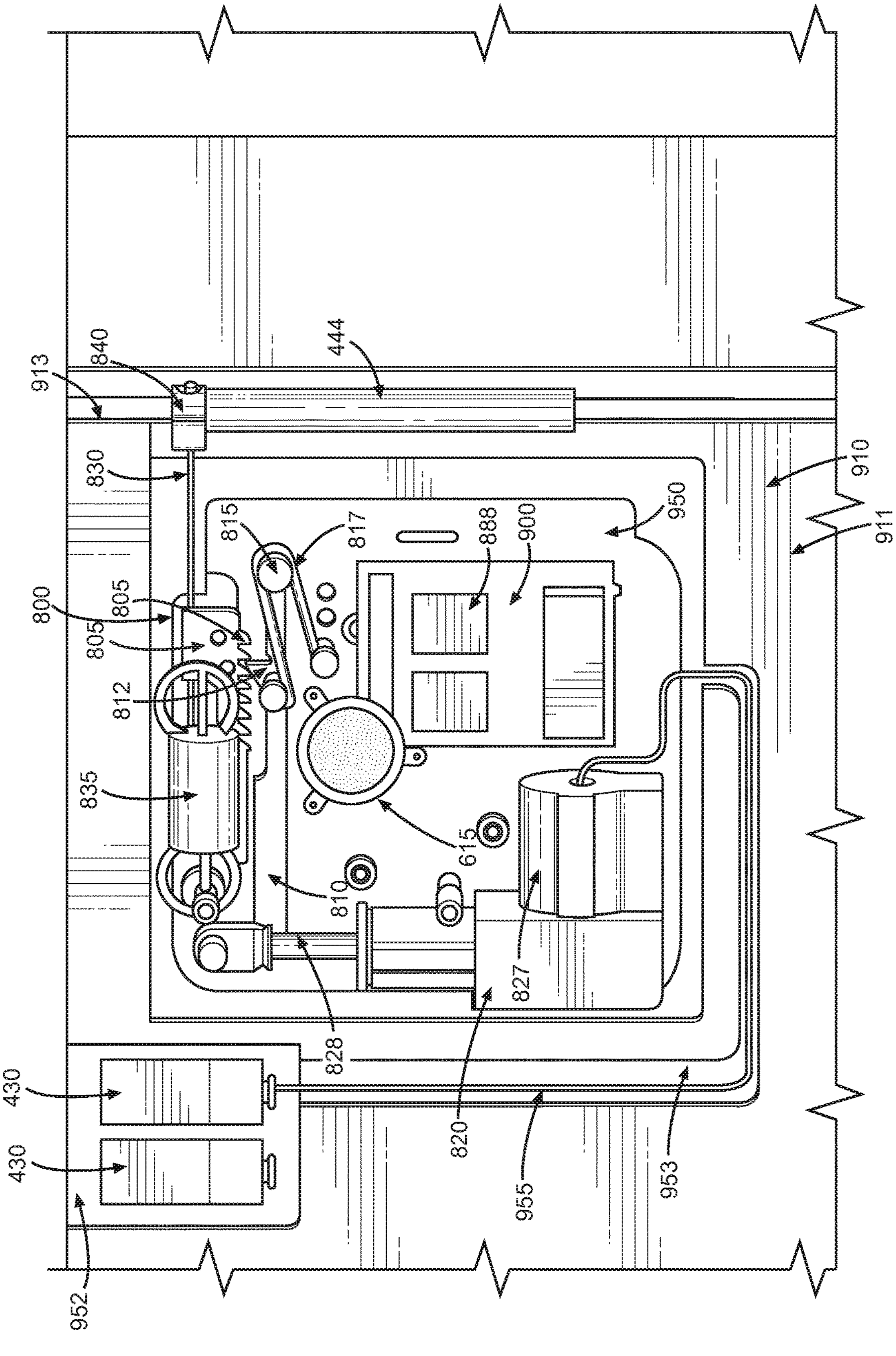
FIG. 10 shows a front view of the preferred embodiment of the emergency door closing device.
Figure 11:
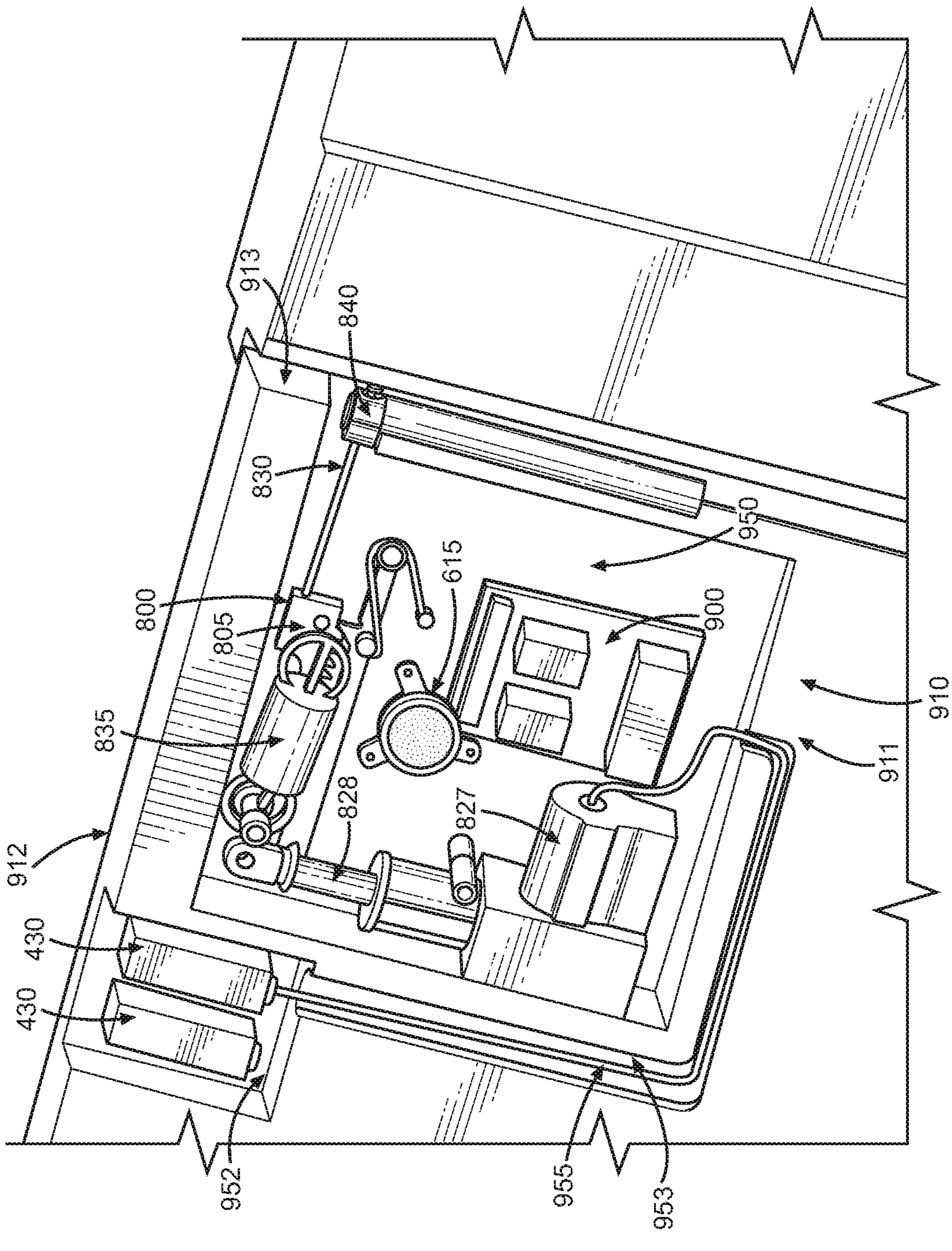
FIG. 11 shows a perspective view of the preferred embodiment of the emergency door closing device of FIG. 10.
Figure 14:
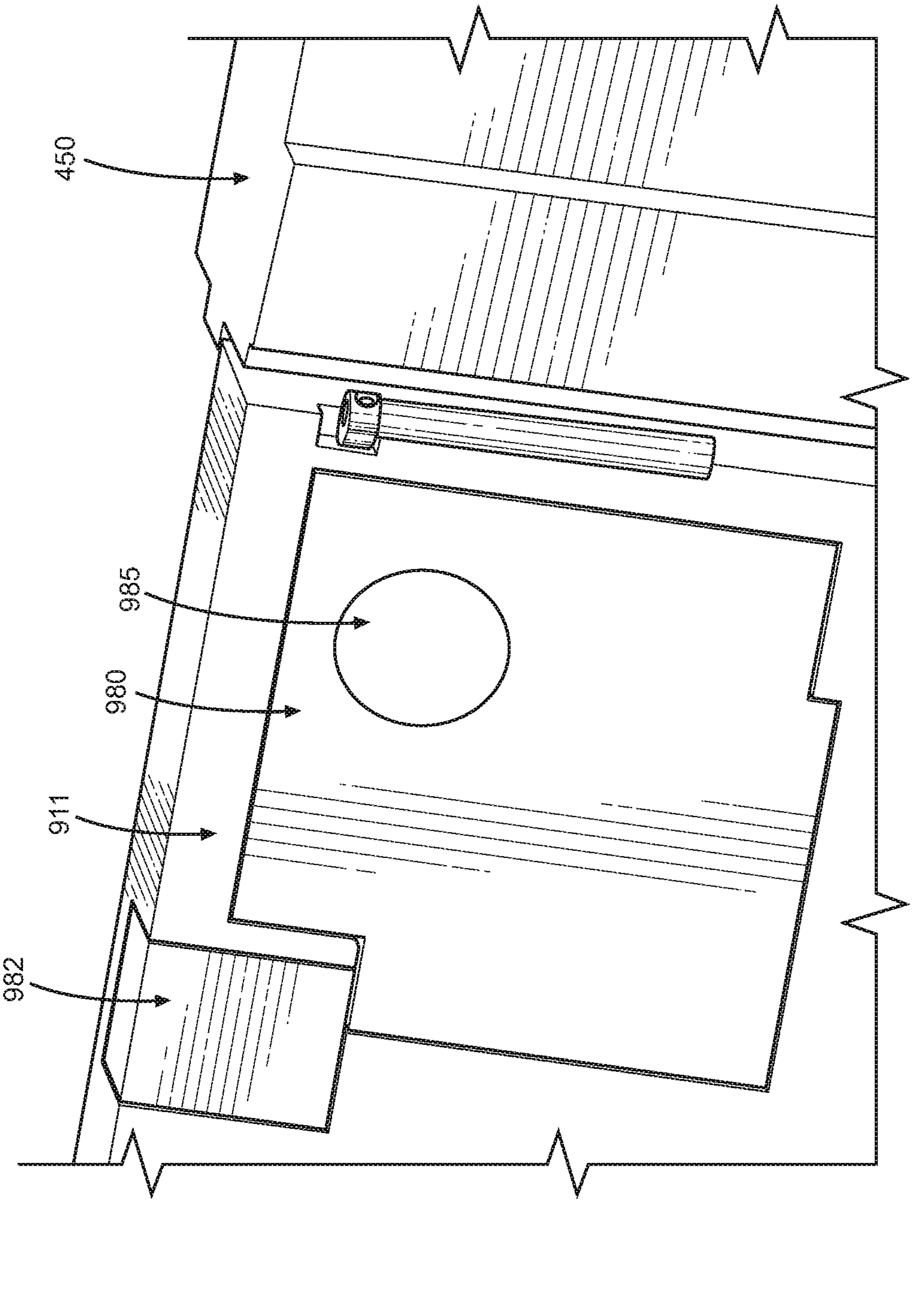
FIG. 14 shows a perspective view of the preferred embodiment of the emergency door closing device of FIG. 10 including first and second cover members covering first, second, and third cut-out sections of a door member.

As illustrated in FIGS. 10, 11, and 14, the emergency door closing device is used in combination with door member 910. The door member 910 includes a front surface 911, a back surface 912, and an edge surface 913, wherein the front surface, the back surface, the said edge surface form an interior volume; at least one hinge member 444 including a first plate member 445 removably connected to the edge section of the door, a second plate member 446 adapted to be removably connected to a door frame 450, and a hinge pin 416 adapted to pivotally connect the first and second plate members together, wherein the at least one hinge member 444 is adapted to pivotally connect the door member 910 to the door frame 450, wherein the front surface 911 and said interior volume include a first cut-out section 950 located in proximity to one of the at least one hinge member 444 and is adapted to retain the base plate of the emergency door closing device therein; a second cut-out section 952 located in proximity to the first cut-out section and is adapted to retain the power source 430 of the emergency door closing device therein; and a third cut-out section 953 located and connected in between the first cut-out section and the second cut-out section and is adapted to retain electrical wires 955 of the emergency door closing device therein. Furthermore, the emergency door closing device further includes electrical wires 955, wherein the via electrical wires are adapted to be located within the third cut-out section 953 of the door, and are electrically connected between the power source 430, the motor member 827, and the fire, smoke, and emergency signal detector 900, and is adapted to send electric power thereto; a first cover member 980 adapted to be removably connected to the front surface of the door and removably cover the first and third cut-out portions of the door; and a second cover member 982 adapted to be removably connected to the front surface of the door and removably cover the second cut-out portion of the door.

Figure 12:
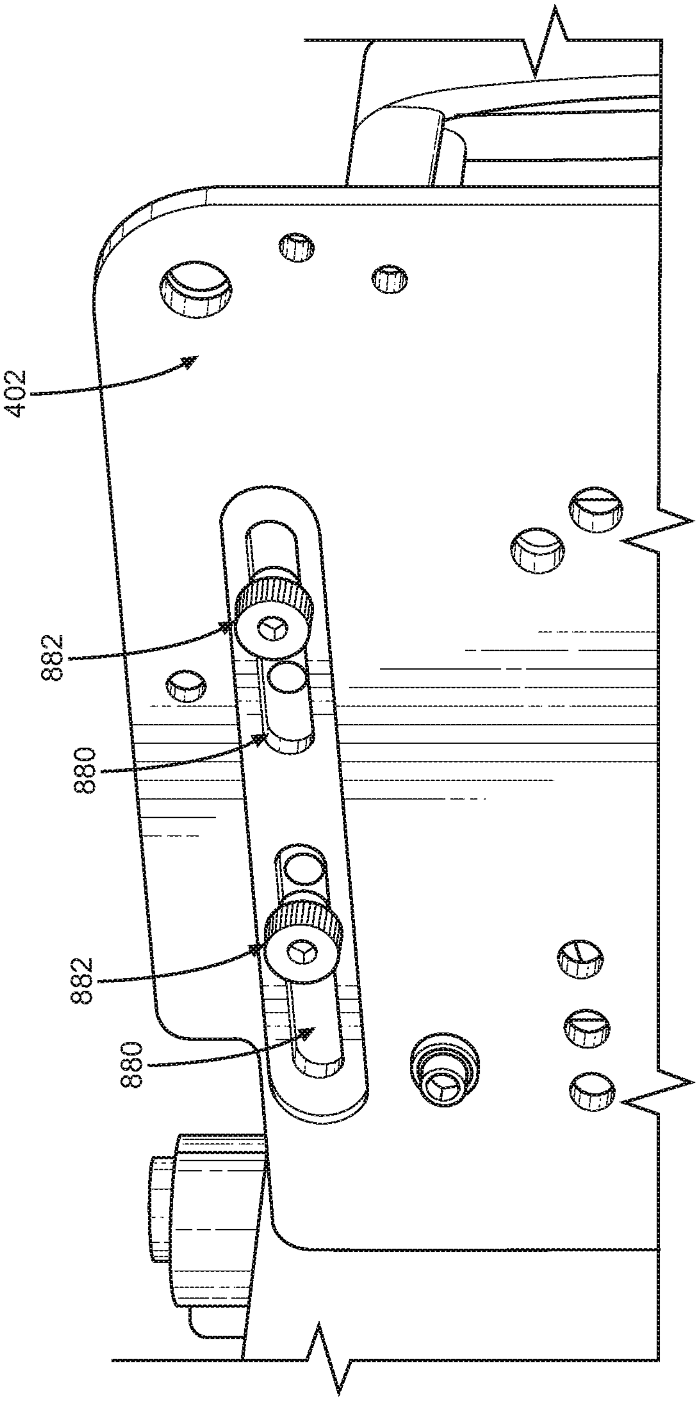
FIG. 12 shows a back perspective view of the preferred embodiment of the emergency door closing device of FIG. 10.
Figure 13:
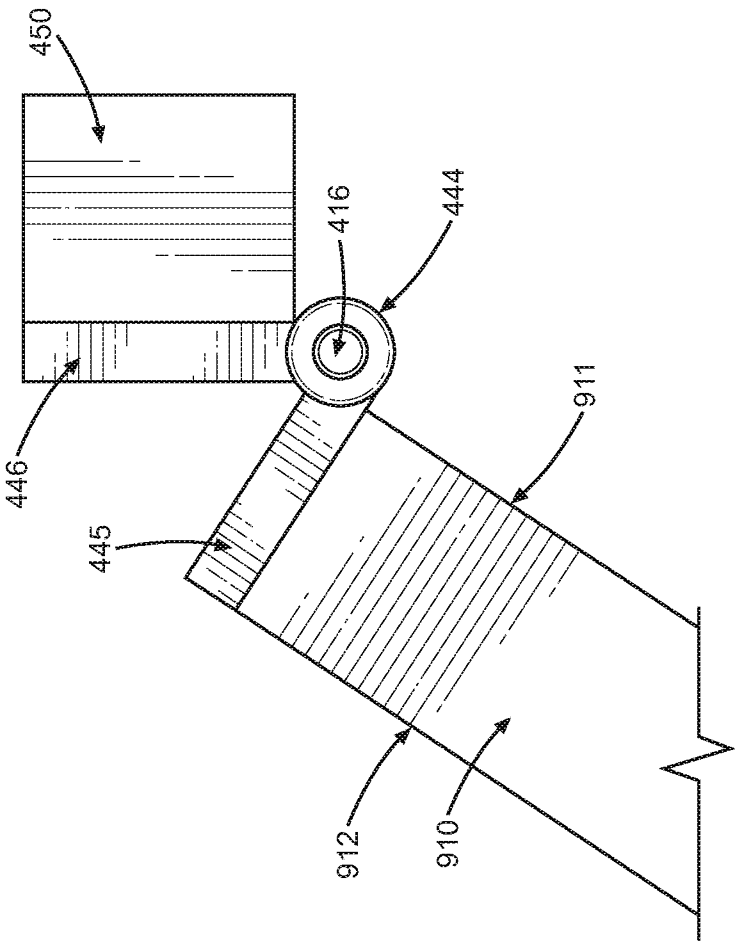
FIG. 13 shows a top view of the preferred embodiment of the emergency door closing device of FIG. 10 in combination with a door member, a door frame, and a hinge member.

As illustrated in FIG. 12, the base plate of the preferred embodiment further includes two linearly extending openings 880 therethrough; and wherein the closing bar 800 includes a main body portion 805 that includes two slide members 882 extending therefrom that are adapted to slidably engage the two linearly extending openings 880 of the base plate member, such that the closing bar is adapted to move linearly back-and-forth within the two linearly extending openings.

In the preferred embodiment, the fire, smoke, and emergency signal detector further includes a light emitting diode 888 adapted to activate when the fire, smoke, and emergency signal detector sends an electric signal to the motor member. Furthermore, the first cover member 980 includes a translucent portion 985 adapted to be in proximity to the light emitting diode 888, such that when the light emitting diode is activated it can be viewed through the first cover member.

Variations of the emergency door closing device include replacing the solenoid with an electric motor and a gear rack for providing a more consistent force and for lower battery consumption. Further, the lever engaging plunger member can be moved by the motor and rack instead of an electromagnet. Furthermore, a geared member (straight or rotary) may be used to stretch one of the spring members when the door opens. And as such, the pawl of the lever arm would control the motion of the geared member to ensure the potential energy of the spring is held until the device is triggered. And, when triggered the lever arm would release the geared member and the spring force would act through the geared member, cable, and pivot cam to close the door.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is:

1. An emergency door closing device adapted to be installed upon an existing door and automatically close said existing door when smoke or fire or an emergency is detected, comprising:

a base plate member;

wherein said base plate member is adapted to be connected to an outer surface of said existing door in proximity to a hinged portion thereof;

a pivot cam member;

wherein said pivot cam member is adapted to be connected to a hinge pin of a hinge member pivotally holding said existing door to a door frame; and wherein said pivot cam member is adapted to be held in place against a hinge plate of said hinge member attached to said door frame;

a closing bar;

wherein said closing bar is linearly movable and biasingly connected to said base plate member, and is adapted to be releasably held in place via a pawl member of a lever member; and wherein said closing bar includes a plurality of gear teeth each adapted to releasably retain said pawl member between any two of said plurality of gear teeth;

a cable member;

wherein said cable member is connected at a distal end to said pivot cam member, and is connected at a proximal end to said closing bar, such that when said existing door is pivoted into said open position said cable member partially wraps around said pivot cam member and pulls upon and linearly moves said closing bar;

a first spring member;

wherein said first spring member is connected between said base plate member and said closing bar;

wherein said first spring member is adapted to gain potential energy when said existing door is moved into said open position and said cable member linearly moves said closing bar;

wherein said first spring member is adapted to retain said potential energy when said closing bar is held in place via said pawl member of said lever member; and wherein when said closing bar is released by said pawl member of said lever member said first spring member releases said potential energy thereby linearly moving said closing bar, thereby pulling said cable member, thereby pushing, pivoting, and closing said existing door member;

a lever member;

wherein said lever member includes a distal end, a proximal end, and a center section;

wherein said lever member is pivotally connected to said base plate member at said distal end thereof via a pivot post;

wherein said lever member includes a pawl member thereon that is adapted to be releasably placed and retained between any two of said plurality of gear teeth of said closing bar, and are adapted to move in and out from between said any two of said plurality of gear teeth via the pivoting motion of said lever member; and wherein said pawl member includes a cam surface on one side thereof adapted to allow said pawl member to progressively move between said plurality of gear teeth as said existing door is opened to thereby progressively increase said potential energy of said first spring member;

a second spring member;

wherein said second spring member is connected to said base plate member at a proximal end thereof, is connected to said pivot post at a middle section thereof, and is connected to said center section of said lever member at a distal end thereof, and is adapted to pivotally bias said lever member about its said distal end and thereby pivot said pawl member toward said closing bar;

a motor member including:

a motor; and a plunger member;

wherein said plunger member is mechanically connected to and is linearly movable via said motor;

wherein said motor member is connected to said base plate member, and said plunger member is connected to said proximal end of said lever member and is adapted to move said proximal end of said lever member via said motor to thereby overcome the spring force of said second spring member and pivot said lever member and move said pawl member out from in between said any two of said plurality of gear teeth of said closing bar, to thereby allow said first spring member to release said potential energy of said first spring member and thereby close said existing door;

a fire, smoke, and emergency signal detector;

wherein said fire, smoke, and emergency signal detector is connected to said base plate member, and is adapted to send an electric signal to said motor member when fire, smoke, or an emergency is detected, to thereby pivot said lever member and move said pawl member out from in between said any two of said plurality of gear teeth of said closing bar to thereby allow said first spring member to release said potential energy of said first spring member and thereby close said existing door; and a power source;

wherein said power source is located in proximity to said base plate member, is electrically connected to said motor member and said fire, smoke, and emergency signal detector, and is adapted to send electric power thereto.

2. The emergency door closing device of claim 1, wherein said pivot cam member includes:

a main body portion including:

a cylindrical center hole adapted to receive the hinge pin of the hinge member therethrough;

an outer surface;

a top surface;

a bottom surface;

wherein said bottom surface is adapted to be placed upon an upper edge of said hinge plate of said hinge member attached to said door frame; and a tang member;

wherein said tang member is attached to and extends from said main body portion, and is adapted to contact a surface of said hinge plate of said hinge member, to thereby prevent rotation of said pivot cam member with respect to said hinge plate of said hinge member when said existing door is being pivoted.

3. The emergency door closing device of claim 2, wherein said main body portion is formed having an oblong cross-section.

4. The emergency door closing device of claim 2, wherein said tang member is formed having a flat surface adapted to be placed against a flat surface of said hinge plate of said hinge member.

5. The emergency door closing device of claim 2, wherein said main body portion further includes an aperture therethrough adapted to receive and hold a portion of said distal end of said cable member therein.

6. The emergency door closing device of claim 5, wherein said distal end of said cable member includes a connector member thereon adapted to be held by said aperture of said main body portion.

7. The emergency door closing device of claim 1, wherein said plurality of gear teeth of said closing bar are located on and extend outwardly from an outer edge thereof.

8. The emergency door closing device of claim 1, wherein said first spring member is formed as a helical spring.

9. The emergency door closing device of claim 1, wherein said second spring member is formed as a helical spring.

10. The emergency door closing device of claim 1, wherein said power source is formed as at least one removable battery member.

11. The emergency door closing device of claim 1, wherein said at least one removable battery member is formed as a nine volt battery member.

12. The emergency door closing device of claim 1, wherein said fire, smoke, and emergency signal detector includes an alarm member adapted to emit an audio sound when fire, smoke, or an emergency signal is detected.

13. The emergency door closing device of claim 12, wherein said alarm member includes a speaker member.

14. The emergency door closing device of claim 1, wherein said base plate includes at least one linearly extending opening therethrough; and wherein said closing bar includes a main body portion, wherein said plurality of gear teeth are located on and extend outwardly from an outer edge of said main body portion; and wherein said main body portion of said closing bar includes at least one slide member extending therefrom adapted to slidably engage with said at least one linearly extending opening of said base plate member, such that said closing bar is adapted to move linearly back-and-forth within said linearly extending opening.

15. The emergency door closing device of claim 14, wherein said cable cylinder member is formed having an oblong cross section to thereby increase said distance said cable member is pulled as said door is pivoted.

16. A combination of a door and an emergency door closing device, said combination comprising:
- a door including:
  - a front surface;
  - a back surface; and
  - an edge surface;
  - wherein said front surface, said back surface, and said edge surface form an interior volume;
  - at least one hinge member including: a
    - first plate member;
      - wherein said first plate member is removably connected to said edge section of said door;
    - a second plate member;
      - wherein said second plate member is adapted to be removably connected to a door frame; and
    - a hinge pin;
      - wherein said hinge pin is adapted to pivotally connect said first and second plate members together;
  - wherein said at least one hinge member is adapted to pivotally connect said door to said door frame;
  - wherein said front surface and said interior volume include: a first cut-out section;
    - wherein said first cut-out section is located in proximity to one of said at least one hinge member and is adapted to retain a base plate of an emergency door closing device therein;
  - a second cut-out section;
    - wherein said second cut-out section is located in proximity to said first cut-out section and is adapted to retain a power source of said emergency door closing device therein; and
  - a third cut-out section;
    - wherein said third cut-out section is located and connected in between said first cut-out section and said second cut-out section and is adapted to retain electrical wires of said emergency door closing device therein; and
- an emergency door closing device adapted to be installed upon and automatically close said door when smoke or fire or an emergency is detected, comprising:
  - a base plate member;
    - wherein said base plate member is adapted to be located and connected within said first cut-out section of said door;
  - a pivot cam member;
    - wherein said pivot cam member is adapted to be connected to said hinge pin of said hinge member; and
    - wherein said pivot cam member is adapted to be held in place against said second plate member of said hinge member of said door;
  - a closing bar;
    - wherein said closing bar is linearly movable and biasingly connected
    - to said base plate member, and is adapted to be releasably held in place via a pawl member of a lever member; and
    - wherein said closing bar includes a plurality of gear teeth each adapted to releasably retain said pawl member between any two of said plurality of gear teeth;
  - a cable member;
    - wherein said cable member is connected at a distal end to said pivot cam member, and is connected at a proximal end to said closing bar, such that when said door is pivoted into said open position said cable member partially wraps around said pivot cam member and pulls upon and linearly moves said closing bar;
  - a first spring member;
    - wherein said first spring member is connected between said base plate member and said closing bar;
    - wherein said first spring member is adapted to gain potential energy when said door is moved into said open position and said cable member linearly moves said closing bar;
    - wherein said first spring member is adapted to retain said potential energy when said closing bar is held in place via said pawl member of said lever member; and wherein when said closing bar is released by said pawl member of said lever member said first spring member releases said potential energy thereby linearly moving said closing bar, thereby pulling said cable member, thereby pushing, pivoting, and closing said door member;

a lever member;

wherein said lever member includes a distal end, a proximal end, and a center section;

wherein said lever member is pivotally connected to said base plate member at said distal end thereof via a pivot post;

wherein said lever member includes a pawl member thereon that is adapted to be releasably placed and retained between any two of said plurality of gear teeth of said closing bar, and are adapted to move in and out from between said any two of said plurality of gear teeth via the pivoting motion of said lever member; and wherein said pawl member includes a cam surface on one side thereof adapted to allow said pawl member to progressively move between said plurality of gear teeth as said door is opened to thereby progressively increase said potential energy of said first spring member;

a second spring member;

wherein said second spring member is connected to said base plate member at a proximal end thereof, is connected to said pivot post at a middle section thereof, and is connected to said center section of said lever member at a distal end thereof, and is adapted to pivotally bias said lever member about its said distal end and thereby pivot said pawl member toward said closing bar;

a motor member including: a motor; and a plunger member;

wherein said plunger member is mechanically connected to and is linearly movable via said motor;

wherein said motor member is connected to said base plate member, and said plunger member is connected to said proximal end of said lever member and is adapted to move said proximal end of said lever member via said motor to thereby overcome the spring force of said second spring member and pivot said lever member and move said pawl member out from in between said any two of said plurality of gear teeth of said closing bar, to thereby allow said first spring member to release said potential energy of said first spring member and thereby close said door;

a fire, smoke, and emergency signal detector;

wherein said fire, smoke, and emergency signal detector is connected to said base plate member, and is adapted to send an electric signal to said motor member when fire, smoke, or an emergency is detected, to thereby pivot said lever member and move said pawl member out from in between said any two of said plurality of gear teeth of said closing bar to thereby allow said first spring member to release said potential energy of said first spring member and thereby close said door; and a power source;

wherein said power source is adapted to be located and connected within said second cut-out section of said door, is electrically connected to said motor member and said fire, smoke, and emergency signal detector via electrical wires, and is adapted to send electric power thereto; and electrical wires:

wherein said via electrical wires are adapted to be located within said third cut-out section of said door, and are electrically connected between said power source, said motor member, and said fire, smoke, and emergency signal detector, and is adapted to send electric power thereto;

a first cover member;

wherein said first cover member is adapted to be removably connected to said front surface of said door and removably cover said first and third cut-out portions of said door; and a second cover member;

wherein said second cover member is adapted to be removably connected to said front surface of said door and removably cover said second cut-out portion of said door.

17. The combination of claim 16, wherein said fire, smoke, and emergency signal detector includes a light emitting diode adapted to activate when said fire, smoke, and emergency signal detector sends an electric signal to said motor member.

18. The combination of claim 17, wherein said first cover member includes a translucent portion adapted to be in proximity to said light emitting diode, such that when said light emitting diode is activated light can be viewed through said first cover member.

19. The combination of claim 16, wherein said pivot cam member includes:

a main body portion including:

a cylindrical center hole adapted to receive the hinge pin of the hinge member therethrough;

an outer surface;

a top surface;

a bottom surface;

wherein said bottom surface is adapted to be placed upon an upper edge of said second plate member attached to said door frame; and a tang member;

wherein said tang member is attached to and extends from said main body portion, and is adapted to contact a surface of said second plate member of said hinge member, to thereby prevent rotation of said pivot cam member with respect to said hinge plate of said hinge member when said existing door is being pivoted.

20. The combination of claim 16, wherein said base plate includes at least one linearly extending opening therethrough; and wherein said closing bar includes a main body portion, wherein said plurality of gear teeth are located on and extend outwardly from an outer edge of said main body portion; and wherein said main body portion of said closing bar includes at least one slide member extending therefrom adapted to slidably engage with said at least one linearly extending opening of said base plate member, such that said closing bar is adapted to move linearly back-and-forth within said linearly extending opening.

* * * * *